United States Patent
Esteban Cornejo

(10) Patent No.: US 8,082,782 B2
(45) Date of Patent: Dec. 27, 2011

(54) METHOD AND APPARATUS FOR MONITORING WIND TURBULENCE INTENSITY

(75) Inventor: Millan Esteban Cornejo, Madrid (ES)

(73) Assignee: Gamesa Innovation & Technology S.L., Sarriguren (ES)

( * ) Notice: Subject to any disclaimer, the term of this patent is extended or adjusted under 35 U.S.C. 154(b) by 318 days.

(21) Appl. No.: 12/484,582

(22) Filed: Jun. 15, 2009

(65) Prior Publication Data

US 2010/0313650 A1    Dec. 16, 2010

(51) Int. Cl.
    *G01P 5/00*    (2006.01)
(52) U.S. Cl. ............... 73/170.11; 73/170.01; 73/170.02
(58) Field of Classification Search .................. None
    See application file for complete search history.

(56) References Cited

U.S. PATENT DOCUMENTS

| | | | |
|---|---|---|---|
| 6,070,461 A * | 6/2000 | Gjessing et al. | 73/170.15 |
| 6,601,447 B1 * | 8/2003 | Loucks | 73/170.11 |
| 6,688,169 B2 * | 2/2004 | Choe et al. | 73/170.13 |
| 6,857,312 B2 * | 2/2005 | Choe et al. | 73/170.13 |
| 7,284,421 B2 * | 10/2007 | Martin | 73/170.13 |
| 2008/0271524 A1 * | 11/2008 | Shapira | 73/170.11 |

* cited by examiner

*Primary Examiner* — Lisa Caputo
*Assistant Examiner* — Jermaine Jenkins
(74) *Attorney, Agent, or Firm* — Ladas & Parry LLP

(57) ABSTRACT

A method of determining an estimate of the de-trended turbulence intensity TI in a proposed site for a wind farm including the steps of measuring the wind speed at a predetermined sampling frequency $f_s$ during a number of time periods $p_z$; calculating in each time interval $p_z$ wind speed statistical parameters $V_{mean}$, $\sigma_v$ and a wind speed trend parameter k in real time for each new wind speed measure $x_j$ as a function of the values of said parameters $V_{mean}$, $\sigma_v$, k for the prior wind speed measure $x_{j-1}$ and the new wind speed measure $x_j$; storing the parameters $V_{mean}$, $\sigma_v$, k obtained at the end of each time interval $p_z$; determining the de-trended turbulence intensity TI in said proposed site using said stored parameters $V_{mean}$, $\sigma_v$, k. The invention also refers to an apparatus for acquiring the data needed for the calculation of the de-trended turbulence intensity TI.

5 Claims, 1 Drawing Sheet

METHOD AND APPARATUS FOR MONITORING WIND TURBULENCE INTENSITY

FIELD OF THE INVENTION

This invention relates to a method and an apparatus for monitoring wind characteristic in a proposed site for a wind farm and, in particular, for monitoring the turbulence intensity.

BACKGROUND

The sitting of wind farms has a direct impact on its operating efficiency and profitability and it is therefore decided taking into account among other facts the results of extensive wind speed measurements recorded in apparatus generally known as data loggers.

Known monitoring systems use wind speed measurements at sampling time intervals of some seconds or less at a proposed site and data loggers store the wind speed mean and the wind speed standard deviation for periods of a predetermined duration, typically 10 minutes. These statistical data are then used for evaluating the suitability of the site for installing one or more wind turbines. The basic wind speed time-series are not stored in data loggers.

For evaluating the suitability of a site for a wind farm, the knowledge of the turbulence intensity at the site is very important. Wind turbines are subjected to a big amount of loads during its operating life (20 years) and most of them are aerodynamic loads due to wind intensity whose variation produce fatigue on the wind turbine components.

The variation of the wind speed is distributed according an spectrum of cycles at different frequencies depending on the different size and duration of the gusts.

The turbulence intensity in a given period is obtained dividing the wind speed standard deviation by the wind speed mean in the period:

$$T.I. = \sigma_v / V_{mean}$$

The standard deviation of the wind speed time-series $\sigma_v$ represents the integral effect of the varying frequency fluctuations:

$$\sigma_v = \int_0^\infty S_v(f) df$$

Unfortunately, the measured standard deviation of the wind speed time-series also includes the very low frequency variation corresponding to a more or less continuous rise or decrease of the wind speed (wind speed trend) in the 10 minutes period that can not be suitably considered as turbulence and should be removed.

So, the obtaining of a suitable turbulence intensity should consist on calculating the fitted straight line that correspond to the trend line and subtract it to the original time-series.

The trend is very site dependent and result in higher values for places with an oceanic climate where frontal passages are very frequent.

Although it is known that the fatigue on the wind turbine components is mainly dependant on the de-trended turbulence intensity because the trend part of the turbulence intensity affects to low frequency fluctuations that are not prejudicial for the wind turbine, the known systems for monitoring the wind characteristics in a proposed site for a wind farm are not able to eliminate the trended part of the turbulence intensity.

The present invention is intended to solve that drawback.

SUMMARY OF THE INVENTION

It is an object of the present invention to provide methods and apparatus for assessing the suitability of a proposed site for a wind farm.

It is another object of the present invention to provide methods and apparatus allowing that sitting of wind farms can be optimized for any wind regime.

It is another object of the present invention to provide methods and apparatus for obtaining accurate de-trended values of the turbulence intensity in a proposed site for a wind farm.

In one aspect, these and other objects are met by providing a method of determining an estimate of the de-trended turbulence intensity TI in a proposed site for a wind farm including the steps of: measuring the wind speed at a predetermined sampling frequency $f_s$ during a number of time periods $p_z$; calculating in each time interval $p_z$ wind speed statistical parameters $V_{mean}$, $\sigma_v$ and a wind speed trend parameter k in real time for each new wind speed measure $x_j$ as a function of the values of said parameters $V_{mean}$, $\sigma_v$, k for the prior wind speed measure $x_{j-1}$ and the new wind speed measure $x_j$; storing the parameters $V_{mean}$, $\sigma_v$, k obtained at the end of each time interval $p_z$; determining the de-trended turbulence intensity TI in said proposed site using said stored parameters $V_{mean}$, $\sigma_v$, k.

In another aspect, these and other objects are met by providing an apparatus for acquiring relevant data for determining an estimate of the de-trended turbulence intensity TI in a proposed site for a wind farm, comprising sensor means that provide wind speed measures $x_j$ at a predetermined sampling frequency $f_s$; processor means that calculates for a number of time periods $p_z$ wind speed statistical parameters $V_{mean}$, $\sigma_v$ and a wind speed trend parameter k in real time for each new wind speed measure $x_j$ as a function of the values of said parameters $V_{mean}$, $\sigma_v$, k for the prior wind speed measure $x_{j-1}$ and the new wind speed measure $x_j$; a memory that stores said parameters $V_{mean}$, $\sigma_v$ k for said time periods $p_z$.

Other features and advantages of the present invention will be understood from the following detailed description in relation with the enclosed drawings.

DETAILED DESCRIPTION OF PREFERRED EMBODIMENTS

Figure 1:
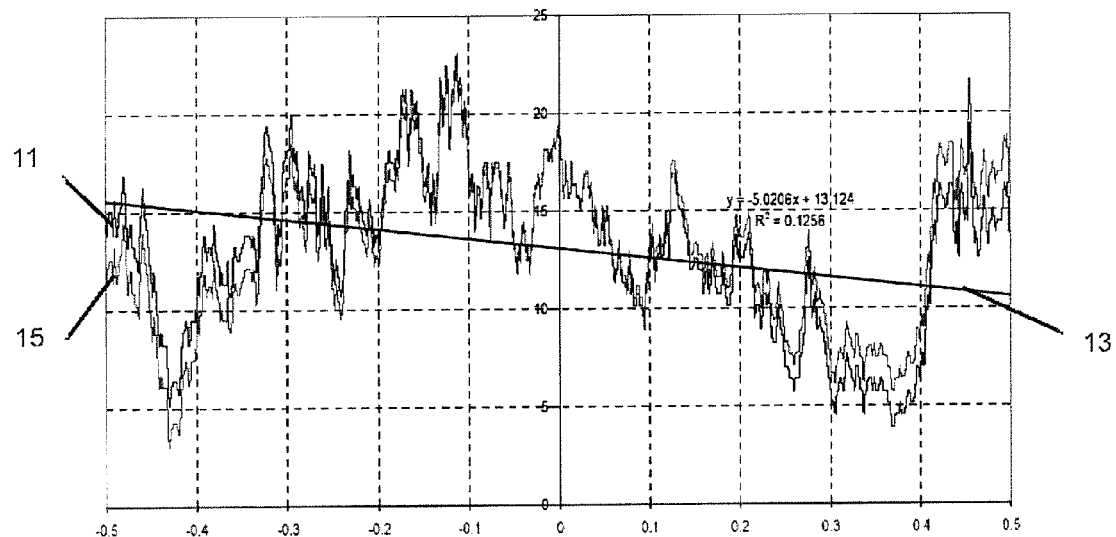
FIG. 1 shows an original wind speed time-series, a wind speed de-trended time-series and a straight line representing the trend.

In reference to the wind speed time-series 11 shown in FIG. 1 for a given measuring period we will describe in the first place a known method to obtain a de-trended value of the turbulence intensity.

The trend is assumed to be linear during the measuring period (typically 10 minutes) according to:

$$V_k = A + k\frac{t}{T}.$$

The slope k and offset A are fitted with a least square method (see the trend line 13 in FIG. 1).

The variance of the trending will be $\sigma_{trend}^2 = \overline{V_{trend}^2} - \overline{V_{trend}}^2$ $$\overline{V_{trend}} = \frac{1}{T}\int_{-T/2}^{T/2}\left(A + k\frac{t}{T}\right)dt$$
$$= \frac{1}{T}\left[At + \frac{k}{2}\frac{t^2}{T}\right]_{-T/2}^{T/2}$$
$$= A$$

$$\overline{V_{trend}^2} = \frac{1}{T}\int_{-T/2}^{T/2}\left(A + k\frac{t}{T}\right)^2 dt$$
$$= \frac{1}{T}\left[A^2 t + \frac{k^2}{3T^2}t^3 + Ak\frac{t^2}{T}\right]_{-T/2}^{T/2}$$
$$= A^2 + \frac{k^2}{12}$$

Then $\sigma_{trend}^2 = \frac{k^2}{12}$

The de-trended wind speed time-series 15 will be:

$$V_{det} = V_{10min} - k\frac{t}{T} \text{ for } -T/2 < T < T/2$$

And the de-trended turbulence intensity is then $$T.I._{det} = \frac{\sqrt{\sigma_{10}^2 - \frac{k^2}{12}}}{V_{10}}$$

Obviously the above method can not be used with the information stored in the known data loggers currently used for wind farm site evaluation purposes as its memory is not dimensioned for storing the complete wind speed time-series but only for the wind speed standard deviation and the wind speed mean values for a number of periods of 10 minutes. On the other hand, the storage of the complete wind speed time-series for allowing the use of the above method does not seem to be a good approach to the problem.

A method according to a preferred embodiment of the present invention for determining the de-trended turbulence intensity follows. Its basic idea is obtaining the trend in real time in a similar manner as the wind speed mean and the wind speed standard deviation are obtained in known data loggers.

The mean $A_n$ of n values $x_1, \ldots, x_n$ can be obtained in real time as a function of its value for the prior sample and the new sample according to the formula $$A_j = \frac{(j-1)A_{j-1} + x_j}{j}.$$

Similarly the variance, defined as $$\sigma^2 = \frac{1}{n-1}\left[\sum_{j=1}^{n}x_j^2 - nA_n^2\right],$$

can be obtained in real time according to the formula $$\sigma_j^2 = \frac{1}{j-1}\left[(j-2)\sigma_{j-1}^2 - \left(\frac{j}{j-1}\right)(x_j - A_j)^2\right].$$

Thus the mean $V_{mean}$ and the standard deviation $\sigma_v$ of the wind speed time-series $x_1, \ldots, x_n$ of a 10 minutes period can be obtained in this way.

The trend for the same wind speed time-series is obtained by least squares fitting x=k t/T+A, the slope k of the least square straight line being obtained as $$k = \frac{nS_{xt} - S_x S_t}{nS_{tt} - S_t S_t}$$

being $$S_t = \sum_{1}^{n} t_i; \; S_x = \sum_{1}^{n} x_1; \; S_{tt} = \sum_{1}^{n} t_i^2; \; S_{xt} = \sum_{1}^{n} x_i t_i$$

where t=time and x=wind speed, n=known number of samples.

As the values of time samples follow a sequence depending on the sampling time:

$$S_t = \sum_{1}^{n} t_i = \sum_{1}^{n} \frac{i}{f_s T} = \frac{1}{f_s T}\sum_{1}^{n} i = \frac{n(n+1)}{2 f_s T}$$

$$S_x = \sum_{1}^{n} x_i$$

$$S_{tt} = \sum_{1}^{n} t_i^2 = \sum_{1}^{n} \frac{i^2}{f_s^2 T^2} = \frac{1}{f_s^2 T^2}\sum_{1}^{n} i^2 = \frac{n + 3n^2 + 2n^3}{6 f_s^2 T^2}$$

$$S_{xt} = \sum_{1}^{n} x_i t_i = \sum_{1}^{n} \frac{x_i i}{f_s T} = \frac{1}{f_s T}\sum_{1}^{n} x_i i$$

$S_{xt}$ and $S_x$ can be obtained in real time from the previous i values as:

$$S_{xij} = \frac{1}{f_s T}\sum_{1}^{j} x_j j$$
$$= \frac{1}{f_s T}\left[x_j j + \sum_{1}^{j-1} x_{j-1}(j-1)\right]$$
$$= \frac{1}{f_s T}[x_j \cdot j + B_{j-1}] \text{ being } B_j = \sum_{1}^{j} x_j j$$

-continued $$S_{xj} = \sum_{1}^{j} x_j = x_j + \sum_{1}^{j-1} x_{j-1} = x_j + S_{x(j-1)}$$

Substituting the terms in the formula for the slope k we obtain a result with the general formulation $k = C \cdot H_n$, where $$C = \frac{12 f_s T}{n^4 - n^2}$$

and $H_n$ is obtained by accumulation of the Hj values in real time from the previous $H_{j-1}$ according to the formula:

$$H_j = j(x_j j + B_{j-1}) - \frac{j(j+1)}{2}(x_j + S_{xj-1})$$

The de-trended turbulence intensity is then $$T.I._{det} = \frac{\sqrt{\sigma_{10}^2 - \frac{k^2}{12}}}{V_{10}}$$

Figure 2:
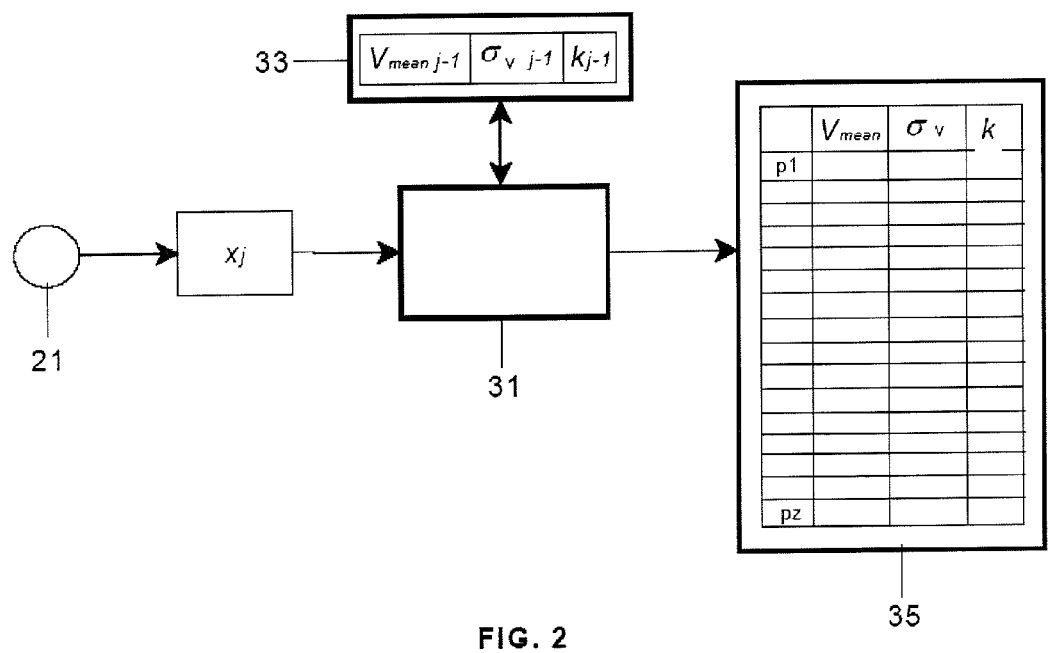
FIG. 2 is a schematic block diagram illustrating an apparatus according to the present invention.

We will now describe a preferred embodiment of an apparatus according to the present invention following FIG. 2.

The apparatus has a similar hardware configuration to known data loggers and receives wind speed raw data provided by a wind speed detector 21 which is transmitted to the apparatus that incorporates a processor 31 and data storage means 35.

The processor 31 calculates in each one of 10 minutes periods p1, ... pz the values $V_{mean}$, $\sigma_v$, k for each sample of the wind speed time-series corresponding to each period as a function of the values of $V_m$, $\sigma_v$, k for the prior sample $x_{j-1}$ stored in auxiliary memory 33 and the new wind speed measure $x_j$ using the above-mentioned formulas. The final value of $V_{mean}$, $\sigma_v$, k for each period p1, ... pz is stored in the data storage means 35.

This data storage means 35 store the statistical values $V_{mean}$, $\sigma_v$, k for a number z of 10 minutes periods p1, ... pz. These data are used at a later stage for obtaining, among other relevant information for assessing the suitability of the site for a wind farm, the de-trended turbulence intensity.

As the skilled man will easily understood the present invention is not limited to the above-mentioned values of 0,1 second for the sampling frequency and 10 minutes for the time interval considered for obtaining the statistical values of $V_{mean}$, $\sigma_v$, k.

It is thought that de-trending could reduce turbulence intensity values up to 12% in some specific wind farms so the contribution of the present invention for facilitating its calculation is an important advantage for the evaluation of the suitability of a proposed site for a wind farm.

Although the present invention has been fully described in connection with preferred embodiments, it is evident that modifications may be introduced within the scope thereof, not considering this as limited by these embodiments, but by the contents of the following claims.

The invention claimed is:

1. A method of determining an estimate of the de-trended turbulence intensity TI in a proposed site for a wind farm including the steps of:
   measuring the wind speed at a predetermined sampling frequency $f_s$ during a number of time periods $p_z$;
   calculating in each time interval $p_z$ wind speed statistical parameters $V_{mean}$, $\sigma_v$ and a wind speed trend parameter k in real time for each new wind speed measure $x_j$ as a function of the values of said parameters $V_{mean}$, $\sigma_v$, k for the prior wind speed measure $x_{j-1}$ and the new wind speed measure $x_j$;
   storing the parameters $V_{mean}$, $\sigma_v$, k obtained at the end of each time interval $p_z$;
   determining the de-trended turbulence intensity TI in said proposed site using said stored parameters $V_{mean}$, $\sigma_v$, k.

2. The method of claim 1, wherein k is calculated by means of the formula $k = C \cdot H_n$, where $$C = \frac{12 f_s T}{n^4 - n^2}$$

and $H_n$ is obtained by accumulation of the Hj values in real time from the previous $H_{j-1}$ according to the formula:

$$H_j = j(x_j j + B_{j-1}) - \frac{j(j+1)}{2}(x_j + S_{xj-1}).$$

3. The method of claim 1, wherein the step of determining the de-trended turbulence intensity TI includes the step of calculating the variance of the trending as $$\sigma_{trend}^2 = \frac{k^2}{12}.$$

4. An apparatus for acquiring relevant data for determining an estimate of the de-trended turbulence intensity TI in a proposed site for a wind farm, the apparatus comprising:
   sensor means that provides wind speed measures $x_j$ at a predetermined sampling frequency $f_s$;
   processor means that calculates for a number of time periods $p_z$ wind speed statistical parameters $V_{mean}$, $\sigma_v$ and a wind speed trend parameter k in real time for each new wind speed measure $x_j$ as a function of the values of said parameters $V_{mean}$, $\sigma_v$, k for the prior wind speed measure $x_{j-1}$ and the new wind speed measure $x_j$;
   a memory that stores said parameters $V_{mean}$, $\sigma_v$, k for said time periods $p_z$.

5. The apparatus of claim 4, wherein k is calculated by means of the formula $k = C \cdot H_n$, where $$C = \frac{12 f_s T}{n^4 - n^2}$$

and $H_n$ is obtained by accumulation of the Hj values in real time from the previous $H_{j-1}$ according to the formula:

$$H_j = j(x_j j + B_{j-1}) - \frac{j(j+1)}{2}(x_j + S_{xj-1}).$$

* * * * *